United States Patent [19]

Albrecht

[11] Patent Number: 5,148,195
[45] Date of Patent: Sep. 15, 1992

[54] LENS SYSTEM HAVING PREDETERMINED FOCUSING POWER IN DIFFERENT MEDIUMS, SUCH AS AIR AND WATER, FOR PROVIDING A CLOSE UP LENS WHICH MAY BE ATTACHED TO A CAMERA EITHER IN AIR OR UNDERWATER

[75] Inventor: Richard E. Albrecht, Honeove Falls, N.Y.

[73] Assignee: Eastman Kodak Company, Rochester, N.Y.

[21] Appl. No.: 687,367

[22] Filed: Apr. 18, 1991

[51] Int. Cl.$^5$ .............................................. G03B 17/08
[52] U.S. Cl. ........................................ 354/64; 359/665
[58] Field of Search ................. 354/64; 359/665, 666, 359/667

[56] References Cited

U.S. PATENT DOCUMENTS

| Re. 30,804 | 11/1981 | Lindemann | 359/667 |
|---|---|---|---|
| 2,256,133 | 9/1941 | Barnes | 354/64 |
| 2,396,267 | 3/1946 | Johnson | 359/895 |
| 3,226,539 | 12/1965 | Rosin | 362/11 |
| 3,391,974 | 7/1968 | Ride | 359/754 |
| 3,565,516 | 2/1971 | Thomas | 359/895 |
| 3,586,419 | 6/1971 | Wakimoto | 359/793 |
| 3,733,981 | 5/1973 | Buchanan | 354/64 |
| 3,788,730 | 1/1974 | Greenleaf | 359/665 |
| 3,899,244 | 8/1985 | Mulder | 359/481 X |
| 4,346,966 | 8/1982 | Nakamura | 359/648 |
| 4,697,897 | 10/1987 | Tamamura | 354/64 |
| 4,844,595 | 7/1989 | Nealy | 359/895 |
| 4,852,508 | 8/1989 | Takada | 354/64 X |
| 4,908,650 | 3/1990 | Taniguchi et al. | 354/64 X |

FOREIGN PATENT DOCUMENTS

| 222429 | 5/1971 | Fed. Rep. of Germany . |
| 50-2174 | 9/1975 | Japan . |
| 414856 | 9/1934 | United Kingdom . |
| 1238668 | 7/1971 | United Kingdom . |

OTHER PUBLICATIONS

Japanese publication, "Photographic Industries".

Primary Examiner—Richard A. Wintercorn
Assistant Examiner—Howard B. Blankenship
Attorney, Agent, or Firm—M. Lukacher; S. Short

[57] ABSTRACT

A two element lens system provides a close up lens system which may be installed on a camera either above or under water, and allows the camera to be used in air and underwater without a means for lens position adjustment. The system uses two meniscus elements in a holder attachable to a receptacle on a camera body over an opening closed by a transparent window element. The lenses define therebetween a sealed compartment and a compartment which is located between one of the lenses and the window element having a vent which allows the water or air to flow into or out of that compartment. The curvatures of the lenses are selected so that the lens system has the same focusing power and focuses an image in an object space at the same image plane (the film plane with the aid of the camera's lens) when the vented compartment is filled with air or with water.

14 Claims, 5 Drawing Sheets

LENS SYSTEM HAVING PREDETERMINED FOCUSING POWER IN DIFFERENT MEDIUMS, SUCH AS AIR AND WATER, FOR PROVIDING A CLOSE UP LENS WHICH MAY BE ATTACHED TO A CAMERA EITHER IN AIR OR UNDERWATER

The present invention relates to an improved lens system having selected focusing powers, which may preferably be the same, when the system is disposed in different mediums having different refractive indexes, such as air and water, and particularly to a camera having said lens system attachable thereto when located either in air or underwater.

The invention is especially suitable for providing a lens system and a camera utilizing such a lens system to provide a close up lens which may be installed either in air or underwater and used to take pictures either in air or underwater without adjustment of the relative positions of the lenses of the system.

Heretofore lenses which have the same focusing power (image distance) independent of the refractive index of the medium in which the lenses are used, have required lenses of predetermined curvature to eliminate refraction at the surface providing an interface with the different media. See U.S. Pat. No. 3,586,419 issued Jun. 22, 1971. Alternatively, such lens systems have required a zoom like capability for changing the image distance to accommodate changes in the refractive indexes of the media. See U.S. Pat. No. 4,346,966 issued Aug. 31, 1982. Another expedient which has been used on an underwater camera is to use special windows to seal the lens system so that it operates in the same medium (air) whether underwater or in air.

It is the principal object of the present invention to provide an improved lens system useful on a camera, particularly an underwater camera, which has the same focusing ability (focuses with the same power at the same image distance) to the same image plane when used in different mediums, such as air and water.

It is another object of the invention to provide an improved lens system suitable for use as a close up lens on an underwater camera which may readily be installed either in air or underwater and is independent, so far as its focusing power is concerned, of the medium in which it is used (whether used in air or underwater).

It is a still further object of the present invention to provide an improved camera and lens system attachable thereto, which system provides predetermined focusing power in different mediums having different refractives indices, such as air or water, which is simple in design and may be fabricated at low cost.

Briefly described, a lens system in accordance with the invention has predetermined focusing powers, which may be the same, when used in different mediums having different indexes of refraction. The system includes a plurality of lenses having surfaces where light undergoes refraction. A holder for these lenses defines closed and open chambers adjacent to different ones of the surfaces. At least one of these chambers is sealed and always contains one of the different mediums. At least another of the chambers is open and receives and contains whichever of the different mediums in which the lens system is disposed. The lenses have curvatures and refractive indices such that the predetermined focusing powers are achieved and an object is focused at a desired image plane, preferably the same image plane, irrespective of which of the mediums in which the lens system is disposed. A camera having a body with an opening into said body having a lens receiving receptacle has facilities for the attachment of the lens system. The lens system may use two lenses, one being a meniscus lens having much less power than the other in one of the mediums which is contained in the sealed compartment. The power of that lens changes when the other medium fills the open compartment so that the system provides the desired power or powers in either of the mediums. The lens system is especially suitable as a close up lens and may be installed when the camera is in either of the mediums (either above or underwater) because the compartment which fills with air or water is disposed adjacent to the camera's body.

The foregoing and other objects, features and advantages of the invention, as well as a presently preferred embodiment thereof, will become more apparent from a reading of the following description in connection with the accompanying drawings in which.

Figure 4:
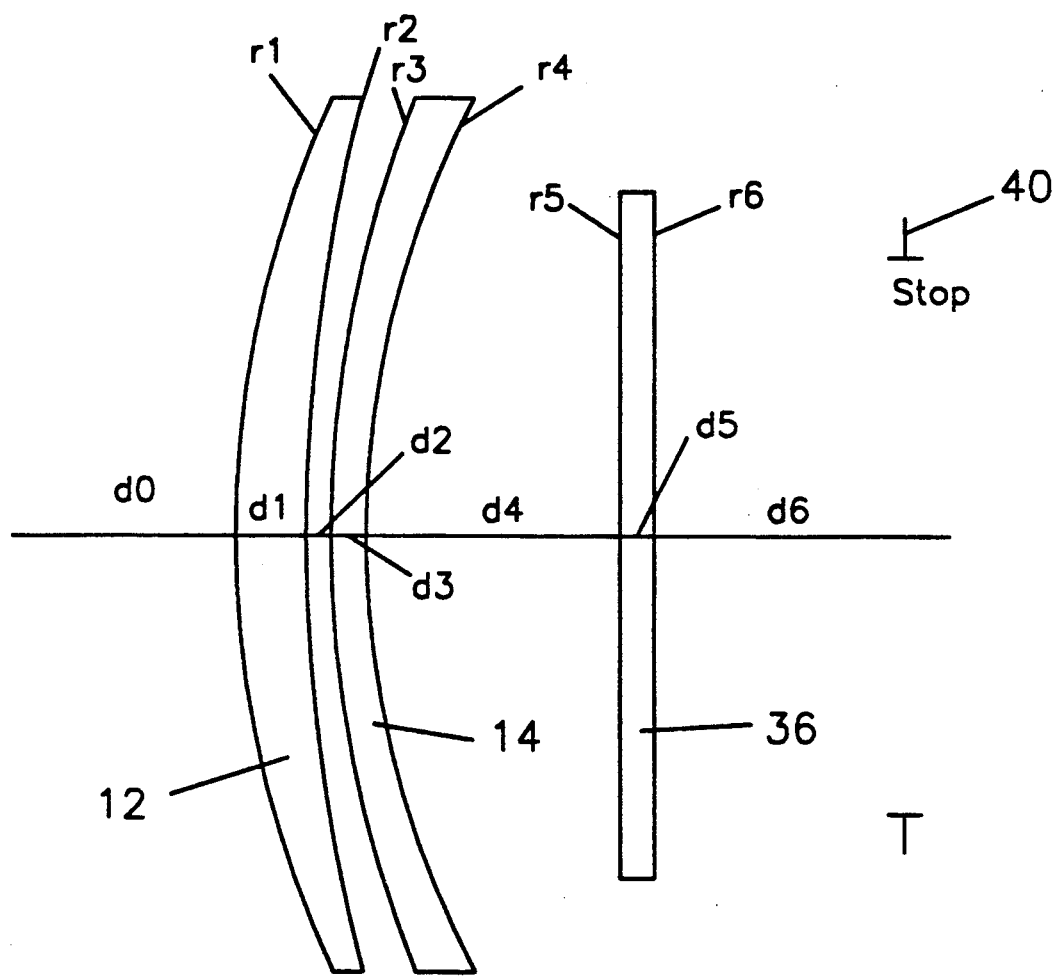
Figure 5:
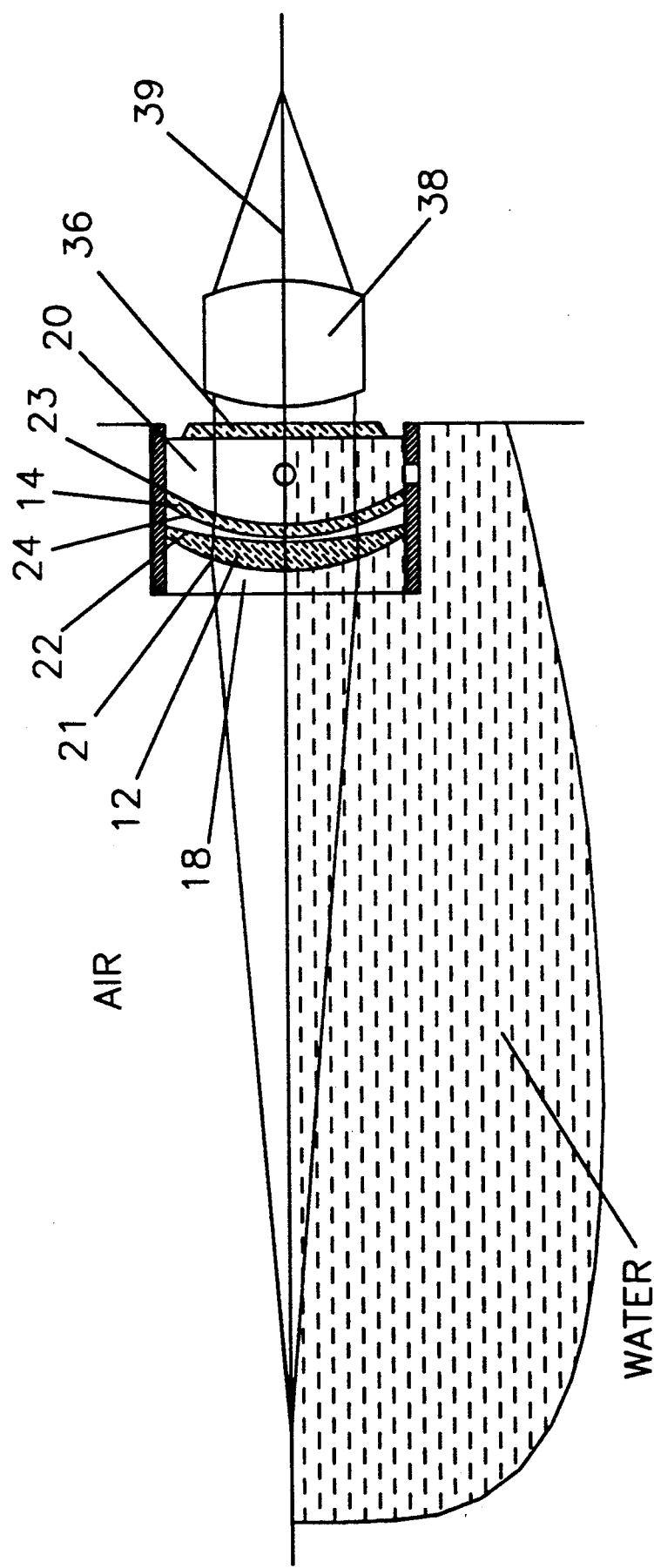

FIG. 4 is a cross-sectional view of the lens system and the window element in the opening of the camera system showing the curvatures, the spacings and the thicknesses of the lens elements and window elements illustrated in the preceding figures; and FIG. 5 is a ray diagram showing that the lens system of the preceding figures has the same power and focuses an object at the same image plane either in air or underwater.

Referring more particularly to the drawings, there is shown a holder, such as a lens barrel 10. This barrel contains two meniscus lenses 12 and 14. These lenses define compartments 16, 18 and 20 in the barrel 10. The compartment 16 is sandwiched between surfaces 22 and 24 of the lenses 12 and 14. The compartment 16 is sealed and contains air (one of the different mediums in which the lens system is to work). The other compartments are open and allow the medium in which the lens system works to flow into and out of these compartments. A plurality of vents 26 and 28 into the compartment 20 allow the flow of the medium into and out of that compartment.

The lens system is attachable to a receptacle 30 on the body 32 of a camera. This camera body has an opening 34 which is sealed by a transparent window element 36. Behind the opening is the camera lens 38. The lens system is assembled by attaching, using a conventional fitting, such as a bayonet or screw fitting, on the receptacle 30 as shown in FIGS. 2 and 3.

Figure 1:
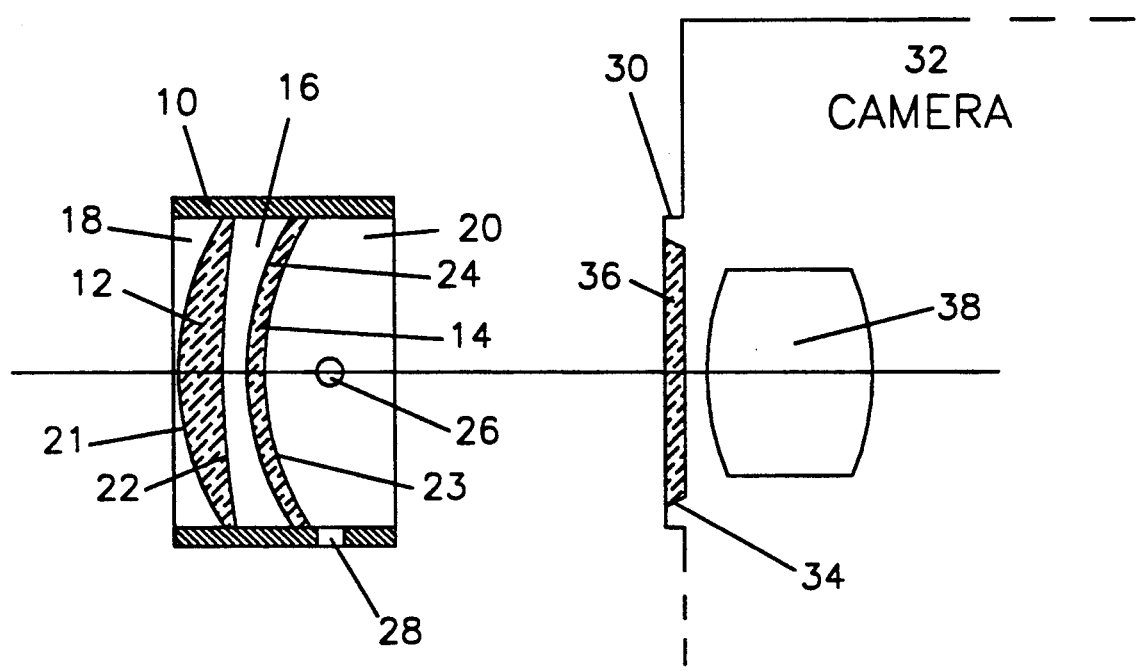
FIG. 1 is a schematic diagram of a lens system and a camera in accordance with the presently preferred embodiment of the invention.
Figure 2:
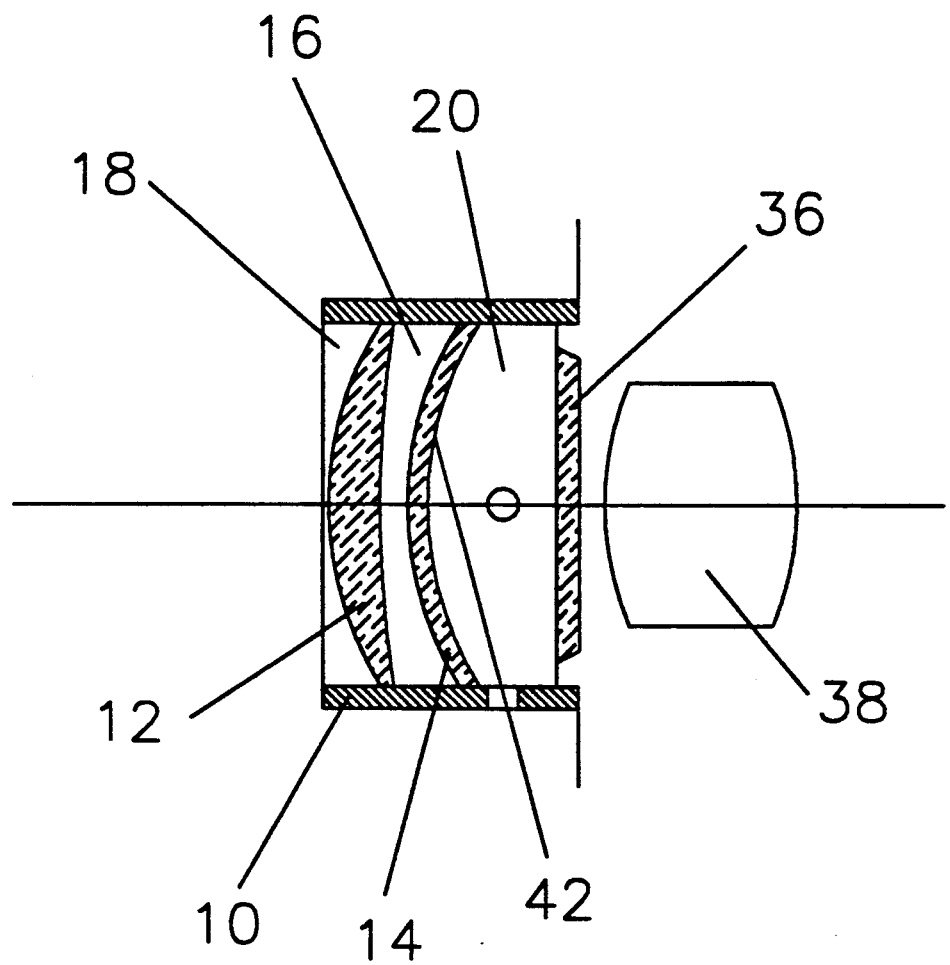
FIG. 2 is a simplified view of the lens system attached to the camera in air.
Figure 3:
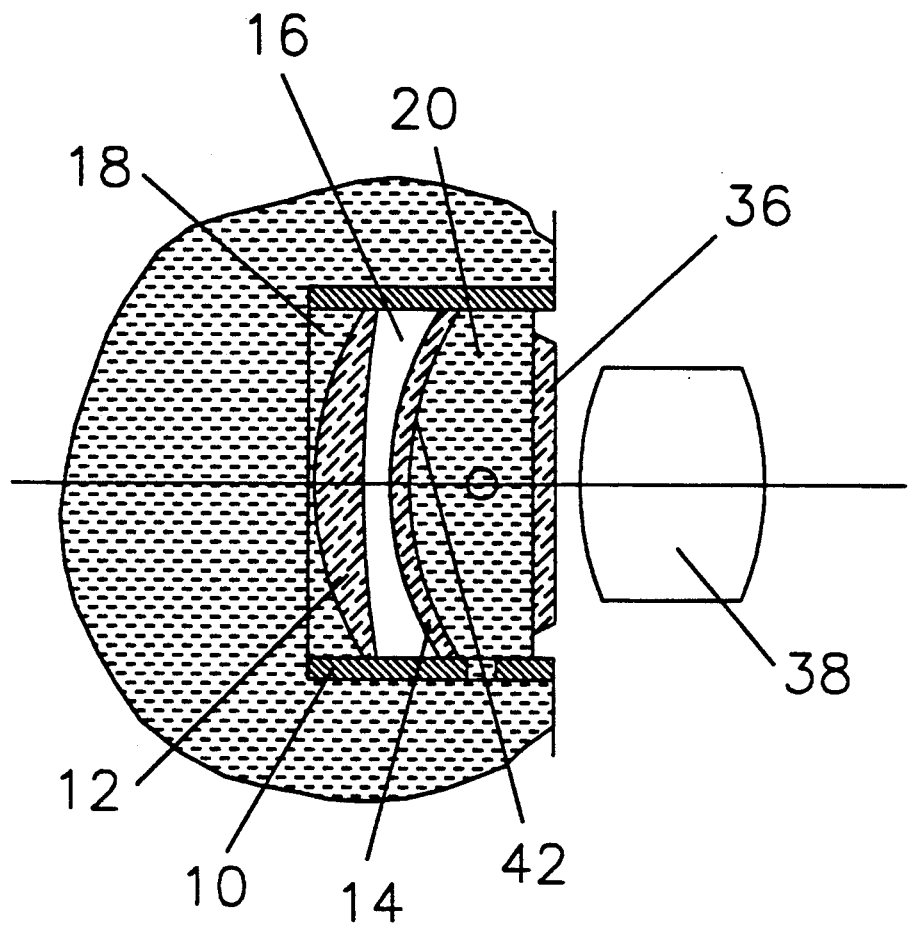
FIG. 3 is a schematic view of the camera and lens system underwater.

When the camera and lens system is in air (as shown in FIG. 2), air fills the compartment 18 facing the object space and the compartment 20 which is then defined between the window element 36, the rear surface 42 of the lens 14, the barrel 10 and the camera body. When the camera is in water, the water (the other medium) fills the compartments 18 and 20. The center compartment 16 remains filled with air.

It is a feature of this invention to allow the lens system to be installed underwater. Heretofore, such installation underwater was not practical since the space between the last lens of the lens system and the camera was required to be filled with air. The lens system preferably provides a close up lens. Thus, when close up pictures are desired when underwater, the operator may merely install the lens system in the same way he or she would install any other lens in a camera operated above water. The need for the operator (a diver) to leave the water to install a close up lens is therefore obviated.

The optics of the lens system will be apparent from FIG. 5 and from the following description. In air, most of the power of the lens system is due to refraction in the lens 12 facing the object space. This power is due to the refractive index of the lens material and the curvature of the lens. The other lens has much less power, and in some embodiments may have essentially zero Power. It is preferable to provide a small amount of Power in the lens 14 in order to correct aberrations. When used in air, the surfaces 21 and 22 of the lens 12 provide most of the refractive power to focus on a close in object. The curvature of these surfaces is indicated as r1 and r2 in FIG. 4. The surfaces 23 and 24 of the inner lens 14 are designed to introduce little or no power when used in air. When used underwater, the refractive power of the surface 21 becomes much weaker due to the index of refraction of the water being very close to the index of refraction of the lens material. An aperture stop 40 is shown on the image side of the lens system.

When underwater, the surface 24 and the window element 36 define a planoconvex lens system and provide most of the power of the lens. Thus, with the two lens elements and the compartments 18 and 20 which are flooded with the medium in which the lens system and camera works, the effect of the difference in index of refraction of the two mediums (air and water) is compensated and the lens can focus at the same image distance or it can be designed to focus at another image distance.

A specific example of the curvatures and spacing of the lenses and the window is set forth in Table 1. The ray diagram of FIG. 5 shows the conditions in air and underwater, above and below the axis 39, respectively, and shows that the difference in index of refraction is compensated and the image distance is the same for operation either in air or in water.

TABLE 1

55 mm lens, F no. = 2.0
d0 = object distance, d0 = 1000.0000
r1 = 58.6178
    d1 = 4.0000, n1 (the lens 12) = 1.51872, v1 = 64.2
r2 = 98.2831
    d2 = 0.5000
r3 = 66.5579
    d3 = 2.0000, n3 (index of the lens 14) = 1.74795, v3 = 44.7
r4 = 52.6518
    d4 = 15.0000
r5 = (infinity)
    d5 = 1.5000, n5 (index of window 36) = 1.51872, v4 = 64.2
r6 = (infinity)
    d6 = 13.7332
r7 = Stop (40)
v1, v3 and v4 are dispersion values for the material of lenses 12 and 14 and the window 35, respectively.

From the foregoing description, it will be apparent that there has been provided an improved lens system and especially an improved lens system and camera utilizing the same as a close up lens. Variations and modifications in the herein described camera and lens system, within the scope of the invention, will undoubtedly suggest themselves to those skilled in the art. Accordingly, the foregoing description should be taken as illustrative and not in a limiting sense.

I claim:

1. A lens system having predetermined focusing power when used in different mediums having different indexes of refraction, said system comprising a plurality of lenses having surfaces where light undergoes refraction, a holder for said lenses defining closed and open chambers adjacent different ones of said surfaces, on of said chambers being sealed and always containing one of said different mediums, and another of said chambers being open to receive and contain whichever of said different mediums in which said lens system is disposed.

2. A camera having a body, an opening into said body having a lens receiving receptacle, said camera having an improved optical system which enables said camber to be used in different mediums having different refractive indexes without refocusing, said improved optical system comprising a lens holder attachable to said camera's receptacle, a plurality of lenses fixedly mounted in said holder, said lenses having surfaces where light undergoes refraction, a transparent element in sealed relationship with said body across said opening and having a surface facing outwardly from said body, said holder, said lenses' surfaces and said element'surface defining a plurality of chambers, a first of said plurality of chambers being between one of said lenses' surfaces and said element's surface, a second of said plurality of chambers being sealed and always containing one of said different mediums, and a third of said plurality of chambers being opened to receive and contain whichever of said different medium in which said camera is disposed.

3. The invention according to claim 1 or claim 2 wherein said different mediums are a first medium and a second medium and wherein said lenses have a refractive index closer to the refractive index of said first medium than said second medium.

4. The invention according to claim 2 wherein one of said different mediums is air and the other is water, the one of said plurality of chambers which is sealed containing air.

5. The invention as set forth in claim 1 or claim 2 wherein said plurality of lenses comprises first and second lenses, one of which has much less power than the other in the one of said different mediums in said sealed chamber.

6. The invention as set forth in claim 1 or claim 2 wherein said plurality of lenses comprise first and second meniscus lenses, one having much less power than the other in said medium in said sealed chamber.

7. The invention as set forth in claim 1 or claim 2 wherein said plurality of lenses define a close up lens system.

8. The invention as set forth in claim 1 wherein aid chambers comprise a further chamber open to an object space facing a surface of one of said plurality of lenses, and said further chamber having at least one vent hole in said holder for the flow of said different mediums.

9. The invention according to claim 8 wherein said further chamber is defined by said holder, a surface of one of said plurality of lenses which has much less powder than another of said plurality of lenses in the one of said mediums in said sealed compartment.

10. The invention as set forth in claim 1 wherein said plurality of lenses have such curvatures and are of such refractive index to provide the same power and focus an object in an object space at the same image plane when said lens system is in either of said different mediums.

11. The invention as set forth in claim 1 wherein said plurality of lenses have such curvatures and are of such refractive index to provide different powers and focus an object in an object space at a selected image plane when said lens system is in either of said different mediums.

12. The invention as set froth in claim 2 wherein said plurality of lenses have such curvatures and are of such refractive index to provide the same power and focus an object in an object space at the same image plane when said camera is in either of said different mediums.

13. The invention as set forth in claim 2 wherein said plurality of lenses have such curvatures and are of such refractive index to provide different powers and focus an object in an object space at a selected image plane when said camera is in either of said different mediums.

14. The invention according to claim 1 wherein one of said different mediums is air and the other is water, the one of said chambers which is sealed containing air.

* * * * *

UNITED STATES PATENT AND TRADEMARK OFFICE
CERTIFICATE OF CORRECTION

PATENT NO. : 5,148,195
DATED : September 15, 1992
INVENTOR(S) : Richard E. Albrecht It is certified that error appears in the above-indentified patent and that said Letters Patent is hereby corrected as shown below:

| | |
|---|---|
| Claim 1, Col. 4, line 10 | Change "on" to --one--. |
| Claim 2, Col. 4, line 17 | Change "camber" to --camera--. |
| Claim 2, Col. 4, line 26 | Change "element" to --element's--. |
| Claim 2, Col. 4, line 33 | Change "medium" to --mediums--. |
| Claim 5, Col. 4, line 45 | Change "comprises" to --comprise--. |
| Claim 8, Col. 4, line 56 | Change "aid" to --said--. |
| Claim 9, Col. 4, lines 63 and 64 | Change "powder" to --power--. |
| Claim 12, Col. 5, line 9 | Change "froth" to --forth--. |

Signed and Sealed this

Twenty-ninth Day of March, 1994

*Attest:*

BRUCE LEHMAN

*Attesting Officer*  *Commissioner of Patents and Trademarks*